United States Patent [19]

Liebling

[11] 4,180,113
[45] Dec. 25, 1979

[54] HAMPER BAG COVER

[76] Inventor: Joel R. Liebling, 125 Hibiscus Dr., Rochester, N.Y. 14618

[21] Appl. No.: 950,865

[22] Filed: Oct. 12, 1978

[51] Int. Cl.² ............................................. B65D 29/00
[52] U.S. Cl. .......................................... 150/7; 150/51
[58] Field of Search ..................... 150/3, 7, 49, 50, 51

[56] References Cited

U.S. PATENT DOCUMENTS

| 3,369,584 | 2/1968 | Faccio | 150/3 |
| 3,396,885 | 8/1968 | Giondi | 150/51 X |
| 3,831,650 | 8/1974 | Consorti | 150/7 |
| 4,120,335 | 10/1978 | Mitchell | 150/7 |

Primary Examiner—Donald F. Norton
Attorney, Agent, or Firm—Stonebraker, Shepard & Stephens

[57] ABSTRACT

A cover for a hamper bag that is supported on a hamper stand is formed of a cloth panel shaped to overlie the top opening of the bag and also fit around the top of the hamper stand. A cloth skirt extends downwardly from the panel around a panel perimeter to fit around the outside of the upper region of the stand, and an elastic strip is arranged around the bottom of the skirt and dimensioned for stretching over and snapping in under the upper region of the stand for releasably holding the panel closed over the top opening of the bag. The panel, skirt, and elastic strip are all secured to the inside of the hamper bag below the top of the bag to be disposed along the upper region of the stand in a hingedly movable orientation.

8 Claims, 4 Drawing Figures

HAMPER BAG COVER

BACKGROUND OF THE INVENTION

Hospitals and nursing homes use hampers for collecting soiled bedding and clothing for laundering, and a typical hamper is formed of a wheeled stand supporting a hamper bag so that the top of the bag is held open for easily receiving items for laundering. Modern hospital and nursing home practice requires that such hampers be covered to prevent the spread of microorganisms from articles in hamper bags, and several covers for hamper bags have been proposed.

This invention involves analysis of the problems and requirements of covers for hamper bags and proposes a hamper bag cover that is both economical to make and efficient to use. The invention aims at low cost, effectiveness, reliability, and ease of operation for a hamper bag cover.

SUMMARY OF THE INVENTION

The inventive cover is for a hamper bag supported on a hamper stand so a top opening of the bag is held open around the upper region of the hamper stand. A cloth panel is shaped to overlie the top opening and also fit around the upper region of the stand, and a cloth skirt extends downwardly from the panel around a perimeter of the panel to fit around the outside of the upper region of the stand. An elastic strip is arranged around the bottom of the skirt and dimensioned for stretching over and snapping in under the upper region of the stand for releasably holding the panel closed over the top opening of the hamper bag. The panel, skirt, and elastic strip are all secured to the hamper bag to be disposed along an upper region of the stand when the hamper bag is mounted on the stand.

DRAWINGS

FIG. 1 is a partially schematic, partially cutaway side elevational view of a preferred embodiment of the inventive hamper bag cover;

FIG. 2 is a partially schematic top view of the bag of FIG. 1 stretched out laterally for conveniently illustrating a preferred embodiment of the inventive cover; and FIGS. 3 and 4 are partially schematic, side elevational views of the hamper bag of FIGS. 1 and 2 mounted on a hamper stand with a preferred embodiment of the inventive cover in an open position in the view of FIG. 3 and in a closed position in the view of FIG. 4

DETAILED DESCRIPTION

Figure 1:
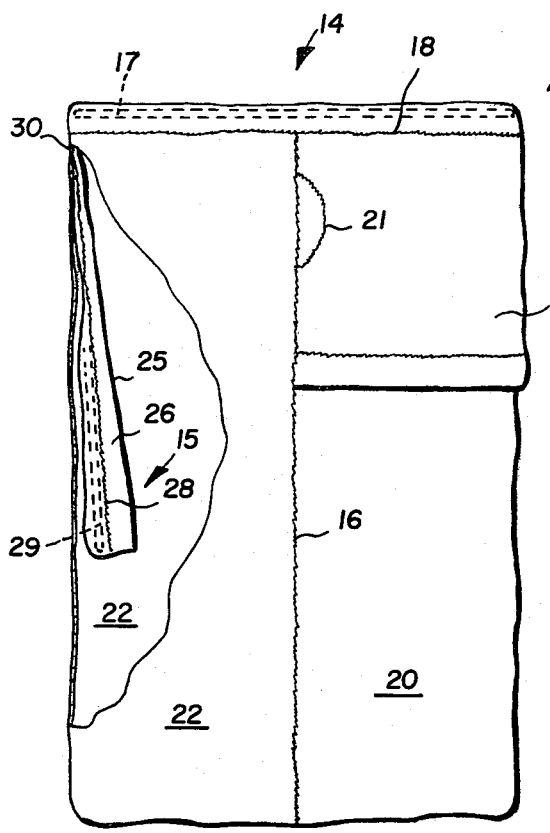
Figure 2:
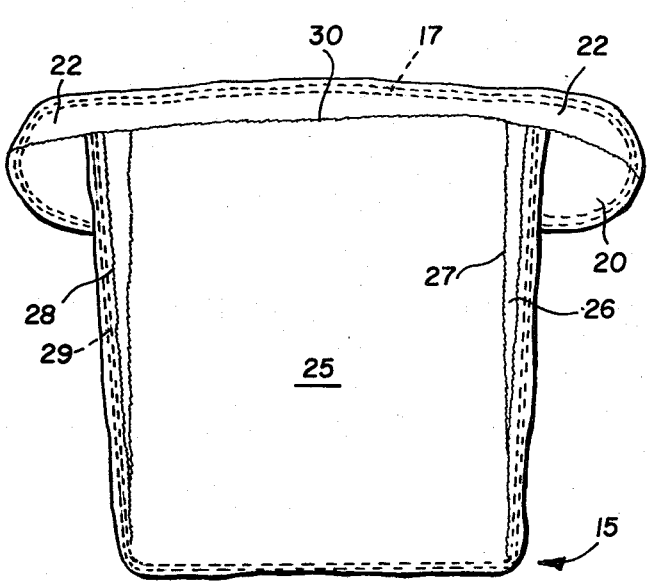
Figure 3:
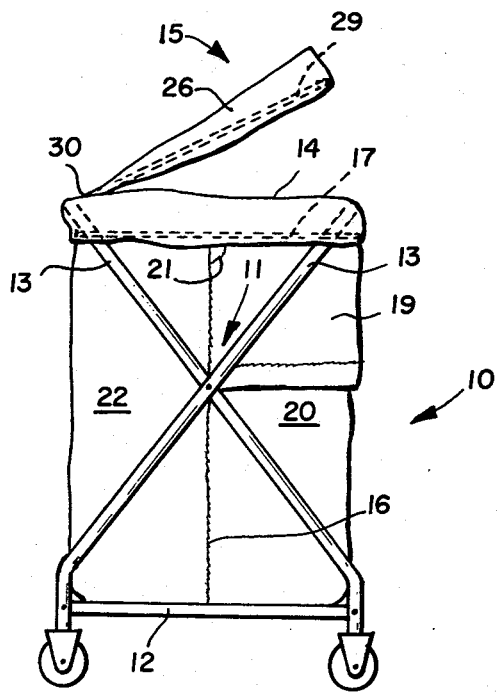
Figure 4:
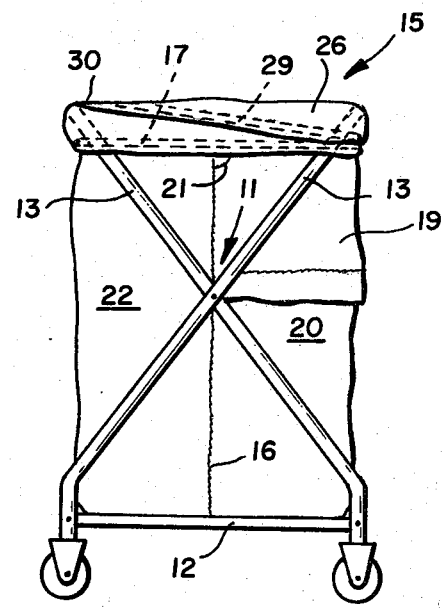

Hamper bags come in many shapes and sizes to fit many different hamper stands, and the illustrated hamper bag 10 is selected as typical of a popular type of hamper bag for convenience in illustrating the invention, which applies fully to other types of hamper bags. Many different materials and constructions can be used in forming hamper bag 10; and bags can be made to fit onto different types of hamper stands, which also can be made in different shapes, sizes, and constructions. Hamper stand 11 as shown in FIGS. 3 and 4 is selected as typical of a popular type of hamper stand that is foldable and is made of tubing in a generally X-shaped configuration as schematically shown in the drawings for convenience in illustrating the invention. Stand 11 has a platform 12 that supports the bottom of bag 10, and bag 10 fits over an upper region 13 of stand 11. This holds a top opening 14 of bag 10 in an open position for receiving laundry, and the inventive cover 15 releasably closes top opening 14.

The illustrated bag 10 has side seams 16 and an elastic strip 17 secured within a hem 18 around top opening 14. Elastic strip 17, as shown by broken lines, is dimensioned to stretch over and snap under the upper region 13 of stand 11 to mount bag 10 in an open position on stand 11. Bag 10 also has a closure flap 19 secured along side seams 16 and extending freely around a front panel 20 for closing bag 10 after it is filled with soiled laundry. This is done by reaching in under closure flap 19, gripping bag 10 in hand grip region 21, and inverting the upper region of bag 10 so that closure flap 19 covers top opening 14.

Cover 15 makes bag 10 easily closable and openable during use so that the contents of bag 10 can be securely enclosed without inconveniencing the people who load the bag. Cover 15 is preferably formed of cloth and is preferably of the same material that is used for forming bag 10. Cover 15 includes a cloth panel 25 shaped to overlie the top opening 14 of bag 10 and also fit around the upper region 13 of stand 11. Panel 25 is thus as wide as the width of the upper region 13 of stand 11, and long enough to extend from the back to the front of the tubular upper regions 13 of stand 11.

A cloth skirt 26 is secured to panel 25 by stitching 27 that extends around a perimeter of panel 25. In the illustrated embodiment, skirt 26 extends around three sides of generally rectangular panel 25, and skirt 26 is dimensioned to fit around the outside of the open top 14 of bag 10 and the upper region 13 of stand 11. An elastic strip 29 is secured around the bottom of skirt 26 within a hem 28 and is dimensioned for stretching over the upper region 13 of stand 11 and for snapping in under the upper region 13 for releasably holding panel 25 closed over top opening 14 of bag 10.

The ends of elastic strip 29 are secured to an upper region of back panel 22 of bag 10, and elastic 29 and skirt 26 are dimensioned so that the bag user can easily stretch elastic 29 and remove it and skirt 26 out from under the tubing at the top front of stand 11 and raise cover 15 with one hand. The user can also easily stretch elastic 29 over the upper front of stand 11 to snap it in under upper region 13 of stand 11 as shown in FIG. 4 to hold cover 15 down over the open top of bag 10.

Panel 25, skirt 26, and elastic strip 29 are preferably all secured to the inside of a back panel 22 of bag 10 by stitching 30 extending along a line spaced below elastic strip 17 at the open top of bag 10. Stitching 30 forms a hinge line for raising and lowering panel 25, skirt 26, and elastic 29 of cover 15; and arranging stitching line 30 below the top of bag 10 disposes cover 15 along the inside of back panel 22 of bag 10, just below the top opening 14 of bag 10. This positions the hinge line 30 of cover 15 along the top rear of hamper stand 11 as shown in FIGS. 3 and 4 for freely raising and lowering cover 15 over top opening 14. It also allows cover 15 to be tucked inside of bag 10 when bag 10 is fully loaded so that closure flap 19 can enclose cover 15 neatly within bag 10 along with its other contents. Forming cover 15 of a simple cloth construction as illustrated also insures that cover 15 is always available for use with bag 10 and never separated from bag 10. The inventive construction also eliminates tie strings, mechanically moving parts, springs, and other complexities previously known in the art. The invention also provides a simple solution to all the requirements in making a low cost cover always connected to the bag it covers and operable in such a simple way that it requires very little extra time of the operator who is thus inclined to use the cover properly.

I claim:

1. A cover for a hamper bag supported on a hamper stand so a top opening of said hamper bag is held open around an upper region of said hamper stand by a top of said hamper bag being noosed around said upper region of said hamper stand, said cover comprising:
   a. a cloth panel shaped to overlie said top opening and also fit around said upper region of said stand;
   b. a cloth skirt extending downwardly from said panel around a perimeter of said panel to fit around the outside said upper region of said stand;
   c. an elastic strip arranged around the bottom of said skirt and dimensioned for stretching over and snapping in under said upper region of said stand for releasably holding said panel closed over said top opening of said hamper bag; and
   d. said panel, said skirt, and said elastic strip all being secured to the inside of said hamper bag along a line spaced below said top of said hamper bag.

2. The cover of claim 1 wherein said panel is generally rectangular, said skirt and said elastic strip extend around three sides of said panel, and said panel is secured to said hamper bag along a fourth side of said panel.

3. The cover of claim 1 wherein said hamper bag has a closure flap, and said cover folds inside said bag and said closure flap when said closure flap is closed.

4. The cover of claim 3 wherein said panel is generally rectangular, said skirt and said elastic strip extend around three sides of said panel, and said panel is secured to said hamper bag along a fourth side of said panel.

5. A cover for a hamper bag supported on a hamper stand so a top opening of said hamper bag is held open around an upper region of said hamper stand, said cover comprising:
   a. a cloth panel shaped to overlie said top opening and also fit around said upper region of said stand;
   b. a cloth skirt extending downwardly from said panel around a perimeter of said panel to fit around the outside said upper region of said stand;
   c. an elastic strip arranged around the bottom of said skirt and dimensioned for stretching over and snapping in under said upper region of said stand for releasably holding said panel closed over said top opening of said hamper bag;
   d. said panel, said skirt, and said elastic strip all being secured to said hamper bag to be disposed along said upper region of said stand; and
   e. said hamper bag having a closure flap, and said cover folding inside said bag and said closure flap when said closure flap is closed.

6. The cover of claim 5 wherein said hamper bag has an elastic top; and said panel, said skirt, and said elastic strip are secured to the inside of said hamper bag along a line spaced below said elastic top.

7. The cover of claim 5 wherein said panel is generally rectangular, said skirt and said elastic strip extend around three sides of said panel, and said panel is secured to said hamper bag along a fourth side of said panel.

8. The cover of claim 7 wherein said hamper bag has an elastic top; and said panel, said skirt, and said elastic strip are secured to the inside of said hamper bag along a line spaced below said elastic top.

* * * * *